(12) United States Patent
Hsiung et al.

(10) Patent No.: US 6,514,471 B1
(45) Date of Patent: Feb. 4, 2003

(54) REMOVING FLUORINE FROM SEMICONDUCTOR PROCESSING EXHAUST GAS

(75) Inventors: Thomas Hsiao-Ling Hsiung, Allentown, PA (US); Howard Paul Withers, Jr., Breinigsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 128 days.

(21) Appl. No.: 09/702,189

(22) Filed: Oct. 31, 2000

(51) Int. Cl.[7] .............................................. C01B 7/20
(52) U.S. Cl. ................................................... 423/240 S
(58) Field of Search .......................... 423/241, 240 S, 423/235, 500; 95/131

(56) References Cited

U.S. PATENT DOCUMENTS

| | | | |
|---|---|---|---|
| 3,813,852 A | 6/1974 | Steineke | ........................ 55/71 |
| 5,417,948 A | 5/1995 | Iwata et al. | .............. 423/239.1 |
| 5,877,391 A | * 3/1999 | Kanno et al. | ........... 423/240 R |
| 6,029,602 A | 2/2000 | Bhatnagar | .................... 118/723 |
| 6,110,436 A | 8/2000 | Scholz et al. | ............... 423/240 |

FOREIGN PATENT DOCUMENTS

| | | | |
|---|---|---|---|
| DE | 4311061 | 3/1993 | ........... B01D/53/36 |
| JP | 230731 | 7/1990 | ......... B01D/153/34 |
| JP | 6134256 | 5/1994 | ........... B01D/53/34 |

OTHER PUBLICATIONS

Goodyear Atomic Corp, "Fluorine Disposal Processes For Nuclear Applications," W.D. Netzer, Apr., 1977. I&EC Process Design & Development, "Fluidized Bed Disposal Of Fluorine," Holmes, et al.
I&EC Process Design & Development, "Fluidized Bed Disposal Of Fluorine," Holmes, et al.
American Chemical Society, "Thermal Decomposition of NF3 by Ti, Si, and Sn Powders," Vileno, et al, 1995.
Chem. Materials, "Thermal Decompostition of NF3 with Various Oxides," Vileno, et al, 1996.

* cited by examiner

Primary Examiner—Wayne A. Langel
Assistant Examiner—Edward M. Johnson
(74) Attorney, Agent, or Firm—Geoffrey L. Chase

(57) ABSTRACT

Fluorine is removed from exhaust gas coming from a cleaning, etching or CVD operation in semiconductor fabrication by passing the gas through a fixed bed of activated alumina having a high total pore volume while maintaining the fluorine level of the gas passing into the alumina bed at 4 volume percent or less. Nitrogen can be added to the exhaust gas to control fluorine concentration. Using alumina having an initial total pore volume above 0.35 cc/gm and limiting the fluorine level in the exhaust gas enables the fixed bed to operate without undue plugging or sintering.

10 Claims, 1 Drawing Sheet

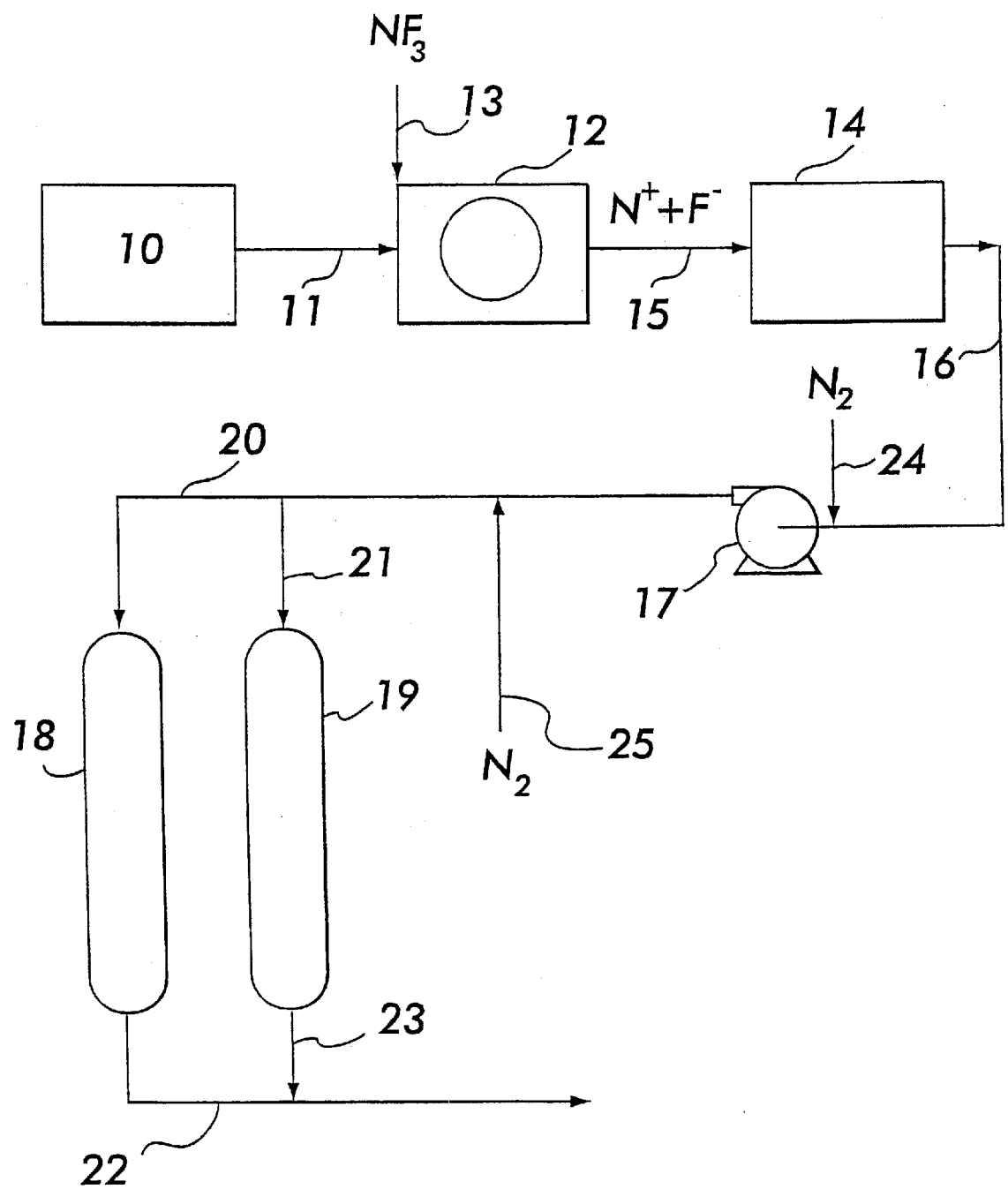

REMOVING FLUORINE FROM SEMICONDUCTOR PROCESSING EXHAUST GAS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to a method of removing fluorine present in exhaust gas from a semiconductor manufacturing operation. In another aspect, it relates to a method of using a fixed bed of activated alumina to remove fluorine and trace fluorine compounds present in such exhaust gases.

In semiconductor fabrication processes, corrosive gases are used to clean process equipment and semiconductor wafers, to etch substrates and for chemical vapor deposition (CVD). Handling the exhaust gases from such operations in a way that protects the environment and workers' health is a major concern. Chemicals present in these exhaust gases are frequently toxic and hazardous so that the waste exhaust stream cannot be vented into the atmosphere without prior treatment.

For example, perfluoro-compounds (PFC's) such as $CF_4$ and $C_2F_6$ are commonly used to clean chambers used for CVD or etching. This cleaning process only partially consumes the PFC's which are a threat to the environment and cannot be released into the atmosphere. PFC emissions by the industry can be reduced or eliminated altogether by using free fluorine gas for chamber cleaning. Handling fluorine safely can be simplified by supplying nitrogen trifluoride ($NF_3$) to the fabrication plant and dissociating it into nitrogen and fluorine radicals just prior to use with microwave-generated plasma. This operation, which is described in U.S. Pat. No. 6,029,602 issued Feb. 29, 2000 to Y. K. Bhatnagar, produces free fluorine radicals which are effective in removing unwanted deposits.

While this approach eliminates PFC emissions, it introduces another problem of how to deal with unreacted fluorine in exhaust gases. The microwave-generated plasma destroys essentially all of the $NF_3$, but significant quantities of $F_2$ remain in the gas stream exiting the treating chamber. This $F_2$ and trace amounts of HF also present have to be removed by treating the exhaust gases before venting.

Several methods for removing fluorine from process gas streams have been proposed. A common method in use involves scrubbing the exhaust gases with caustic solution to form fluoride salts. Although wet scrubbing is efficient for removing $F_2$, it generates large amounts of liquid-slurry wastes that require further treatment before disposal. In addition, caustic scrubbers can generate toxic byproducts such as $OF_2$ and $NOF_3$, raising safety concerns. This method of treatment is described by Netzer, "Fluorine Disposal Processes for Nuclear Applications", issued by Goodyear Atomic Corporation acting under contract with The U.S. Energy Research and Development Administration, April, 1977. This report summarizes advantages and disadvantages of various processes for the removal of fluorine from the effluent of a uranium oxide conversion facility. Two methods that are favored by the author are the use of a fluidized bed of alumina and caustic scrubbing with the fluidized bed method considered superior because of nuclear safety considerations. Other methods considered but eliminated as possibilities for various reasons include packed beds of alumina, soda ash or lime (beds plug frequently and much manpower is required to empty and refill chambers), packed charcoal (possibility of explosion or toxic gas formation), burning with hydrogen (corrosion and toxic gas formation), reaction with ammonia (forms toxic nitrogen trifluoride), reaction with steam (severe corrosion and explosion hazards), and reaction with uranium tetrafluoride (reactor plugging).

Holmes et al., "Fluidized Bed Disposal of Fluorine", *I& EC Process Design and Development*, Vol. 6, No. 4, (1967) address the problem of removing fluorine from a gas stream from nuclear fuel reprocessing. The process proposed is the use of a fluidized bed of activated alumina at a temperature between 300 and 400° C. Use of packed beds of alumina is said to result in sintering with a consequent loss in either throughput or capacity. Heat transfer inside such packed beds is normally not adequate and the fluoridation reaction can generate enough heat to cause the bed to cake up.

Current technology in the semiconductor industry removes $F_2$ by burning it with hydrogen or methane, thereby converting the $F_2$ to HF which is then removed by wet scrubbing. This technique merely substitutes one removal problem for another and does not avoid the disadvantages associated with wet scrubbing. The use of fluidized beds of alumina to remove $F_2$ as recommended by Netzer and Holmes et al. for the atomic energy industry would not be practical for semiconductor fabrication. In the process investigated by Holmes et al. the flow rate was limited to 1.25 to 1.65 minimum fluidization velocity to avoid excessive solids carryover and ensure $F_2$ destruction efficiency. This velocity limitation calls for a reactor with a large cross-sectional area that would take up considerable floor space. Space is precious in a semiconductor fabrication facility where carefully controlled cleanliness is essential. Furthermore, attrition is inherent in a fluidized bed reactor and special devices would be required to handle fines generated to keep them from contaminating the work area.

In the literature on semiconductor processes, a number of methods have been suggested for dealing with removal of $NF_3$ rather than $F_2$ from exhaust streams. For example, Japanese Patent Application No. 61-78863 (Publ. 1990) describes treating nitrogen trifluoride in waste gas from a semiconductor manufacturing operation with carbon lumps, such as activated carbon or charcoal to produce carbon tetrafluoride and nitrogen which are not toxic. Japanese Patent Application No. 4-288479 (Publ. 1994) discloses treating a gas containing nitrogen fluorides from a semiconductor production process with a cleaning agent based on metallic zinc and/or metallic aluminum which can be mixed with inorganic materials such as alumina and silica. The temperature of contact must be below the melting temperature of the metals.

Iwata et al., U.S. Pat. No. 5,417,948 (1995) disclose a process for cleaning a gas containing $NF_3$ using zirconium or a zirconium alloy. Vileno et al., "Thermal Decomposition of $NF_3$ by Ti, Si, and Sn Powders", *Chemical Materials*, 7, pp. 683–687 (1995) describe removal of NF3 from effluent gases from cleaning and etching operations that use $NF_3$ in the semiconductor industry. Titanium, silicon and tin powders were studied in reactions with $NF_3$ to produce nitrogen gas and the corresponding metal fluoride which then requires trapping in an alkaline solution. Vileno et al., "Thermal Decomposition of NF3 with Various Oxides", Chemical Materials, 8, pp. 1217–1221 (1996) describe the use of alumina as a getter for $NF_3$ in off-gases from cleaning and etching operations in the semiconductor industry. Reaction products are nitrogen oxides and aluminum trifluoride.

In the petroleum industry, activated alumina has been used to remove trace quantities of HF from alkylation off-gas. In such processes, the $Al_2O_3$ is converted to $AlF_3$ by reaction with the HF and water is the byproduct. There have been no operational problems caused by the transformation of $Al_2O_3$ to $AlF_3$.

BRIEF SUMMARY OF THE INVENTION

According to our invention, the removal of fluorine from the waste gas of a semiconductor fabrication process can be accomplished in an effective and efficient manner using carefully controlled conditions for a fixed bed of activated alumina through which the waste gas is passed. Plugging is avoided by using alumina having a total pore volume (TPV) of at least 0.35 cc/gm, preferably at least 0.45 cc/gm and by maintaining the fluorine concentration in the exhaust gas to 4 volume percent or less, preferably not over 3 volume percent. If the concentration of fluorine in the gas coming from the process chamber is higher than these values, nitrogen should be added to adjust fluorine concentration to the desired level. In this way it is possible to control bed temperature which should not exceed 500° C. The reaction should take place under ambient temperatures but the bed will heat up due to the reaction between the alumina and the fluorine.

It is preferred that the particle size of the alumina used in the fixed bed be in the nominal range of about ⅛ inch to ¼ inch and that the bed length to diameter ratio be less than 10 to 1. Such a bed configuration can readily handle an exhaust gas throughput of 50 to 60 liters per minute which is a typical waste gas flow rate from a semiconductor fabrication tool. Reactor pressure is normally somewhat below atmospheric, e.g. 14 psia, but atmospheric or higher pressures can be used. Higher pressures would promote the reaction but this condition should be controlled so that the bed temperature does not become so high that sintering occurs.

This invention is particularly useful when combined with the generation of reactive fluorine from $NF_3$ using microwave-generated plasma.

BRIEF DESCRIPTION OF SEVERAL VIEWS OF THE DRAWINGS

The FIGURE is a schematic flow diagram of the process of the invention using a microwave generator to convert $NF_3$ to free fluorine and dilution of exhaust gas with nitrogen prior to contact with the activated alumina in a fixed bed.

DETAILED DESCRIPTION OF THE INVENTION

In the process of our invention fixed beds of activated alumina are used under carefully controlled conditions to react with fluorine present in an exhaust gas stream from a semiconductor fabrication operation. This exhaust stream can be generated in connection with a cleaning operation in which unwanted deposits are removed from a semiconductor etching tool or from a semiconductor wafer. The exhaust stream can also originate in an etching or a CVD operation. Although fixed beds of activated alumina have been considered unsuitable for $F_2$ removal from waste streams in other industries because of sintering and plugging problems, our invention enables this technique to be practiced in the semiconductor industry by carefully controlling the conditions of alumina pore volume and fluorine concentration in the exhaust gas.

Fluorine reacts with alumina in an exothermic reaction to form innocuous $AlF_3$ and oxygen according to the following stoichiometry:

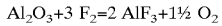

$$Al_2O_3 + 3\ F_2 = 2\ AlF_3 + 1½\ O_2$$

As the alumina converts to $AlF_3$ a density change occurs that can cause complications leading to plugging of fixed bed reactors. The density of $Al_2O_3$ is about 4 gm/cc and the density of $AlF_3$ is about 2.88 gm/cc. Consequently, as the reaction proceeds the volume of the solids tends to expand to cause reactor plugging. This problem has been dealt with in the past by using a fluidized bed of alumina which accommodates this expansion. As has been explained, however, use of fluidized bed reactors for waste gas treatment has major disadvantages in a semiconductor fabrication plant.

The problem of plugging in a fixed bed of activated alumina is addressed in the process of the invention by using alumina having large porosity in its structure and limiting the fluorine concentration in the exhaust gas stream. The porosity of the alumina allows a density change without causing excessive pressure drop across the reactor or resulting in bed plugging. Limiting the fluorine concentration in the exhaust stream controls the heat generated by the reaction of fluorine with alumina which if excessive can result in the development of hot spots within the bed with consequent sintering of the alumina, thereby causing bed plugging. The fluorine level in the exhaust stream can be reduced, if necessary, by the addition of nitrogen prior to passing the stream through the alumina bed.

For each volume percent of fluorine in the exhaust gas passing through the alumina bed, the adiabatic temperature rise can be as high as 159° C. At a fluorine concentration of 3 volume percent, the adiabatic temperature rise in the bed would be about 480° C., well below the melting point of alumina which is above 2000° C. In the operation of our invention, the fluorine concentration does not exceed 4 volume percent, and preferably is 3 percent by volume or less. This level of control will accommodate most semiconductor waste gas streams which typically do not exceed 3 volume percent of fluorine. Diluting the exhaust stream with nitrogen, however, is an effective control technique, which can be regulated in response to a temperature measurement in the alumina bed.

The required porosity for the activated alumina can be expressed in terms of its total pore volume which should be at least 0.35 cc/gm, preferably at least 0.45 cc/gm. Operating in compliance with this requirement of high pore volume for the alumina in combination with the temperature control described above provides effective removal of fluorine from the exhaust stream without undue pressure drop through the alumina bed. An example of a suitable alumina is Alcoa's HF-200. This material is used in the petroleum industry to remove trace quantities of HF from alkylation off-gas. By using this highly porous activated alumina for fluorine removal from waste gas, the density change occurring during the reaction between the $Al_2O_3$ and $F_2$ is accommodated within the alumina particle rather than by swelling of the bed volume which leads to plugging.

Referring now to the FIGURE of the drawing, a schematic flow diagram is shown for a process in which free fluorine is used to clean a semiconductor fabrication process chamber. Microwave energy is passed from a source 10 through waveguide 11 to applicator 12 into which NF$_3$ is fed through conduit 13. Energy source 10 can be mounted directly on applicator 12 without the intervening waveguide as described in U.S. Pat. No. 6,029,602.

Plasma generated in applicator 12 ionizes the NF$_3$ forming free fluorine radicals that are conveyed to process chamber 14 through conduit 15. Contaminating deposits in process chamber 14 are reacted with the free fluorine and removed from the chamber in an exhaust stream. This stream of waste gases is exhausted from chamber 14 through conduit 16 by pump 17. These exhaust gases are fed into columns 18 and 19 through conduits 20 and 21, respectively.

Columns 18 and 19 have been charged with activated alumina that has the required total pore volume prior to its initial contact with the exhaust gases containing fluorine. The alumina is present as fixed beds in these two columns. Waste gas is fed alternately to columns 18 and 19 which are arranged in parallel so that while one bed is on-stream the other is being recharged with fresh alumina or standing by in a ready mode. As soon as the on-stream bed reaches its capacity as indicated by fluorine showing up in its exhaust gas, the process gas is switched to the standby bed and the used bed is recharged with fresh alumina. A particle filter, not shown, can be installed upstream of the alumina beds, if necessary, to remove particulates from the off gas before it enters the alumina beds. Exhaust gases exit beds 18 and 19 through conduits 22 and 23, respectively. These gases which are essentially free of fluorine can be vented to the atmosphere or treated further if desired.

If it is necessary to reduce the fluorine level in the waste gas to 3 volume percent or below prior to passing the gas into the alumina beds, nitrogen can be fed into pump 17 through line 24 or downstream of pump 17 through line 25, thereby diluting the fluorine concentration in the gas feed to the alumina beds. This additional nitrogen feed can be controlled by analysis of the gas feed into the alumina beds with an override control based on temperature measurement within the bed itself which ideally does not exceed 500° C.

Other advantages and features of the invention will be apparent to those skilled in the art from the following example which is illustrative only and should not be construed to limit our invention unduly.

Illustrative Embodiment

A CVD chamber is cleaned by ionizing NF$_3$ in nitrogen carrier gas with a microwave-generated plasma and passing the gas stream containing free fluorine radicals into the CVD chamber were the fluorine reacts with oxide and nitride deposits, removing them from the chamber. Exhaust gas from the chamber contains 3.0 volume percent fluorine and trace amounts of fluorides with the balance nitrogen. Exhaust gas flow rate is 55 liters per minute. This gas is passed into a fixed bed of Alcoa HF-200 activated alumina having a nominal particle size of ⅛ inch and a total pore volume of 0.55 cc/gm. The alumina bed, having a length to diameter ratio of 8/1, operates at atmospheric pressure and a temperature of 480° C. Exit gas from the alumina bed is essentially free of fluorine.

This invention has several advantages over existing technologies that rely on combustion with hydrogen or methane followed by wet scrubbing to remove the generated HF. The invention does not require fuel to "burn" the fluorine, nor does it generate a wastewater stream. Also, risks of corrosion are less since the process produces no HF. It operates efficiently since a gram of alumina can react with approximately one gram of fluorine. The AlF$_3$ formed is innocuous and can be easily handled.

Other embodiments of our invention will be apparent to those skilled in the art from the foregoing disclosure and the following claims without departing from the spirit or scope of the invention.

What is claimed is:

1. A method of removing fluorine from exhaust gas flowing from a semiconductor fabrication operation which comprises passing said exhaust gas into a fixed bed of activated alumina having a total pore volume of at least 0.35 cc/gm while maintaining the fluorine concentration in said exhaust gas passed to said fixed bed at a level not exceeding 4 volume percent, and removing from said fixed bed a gas stream essentially free of fluorine.

2. The method of claim 1 wherein said total pore volume of said fixed bed is at least 0.45 cc/gm.

3. The method of claim 1 wherein said fluorine concentration in said exhaust gas passed to said fixed bed is not over 3 volume percent.

4. The method of claim 1 wherein nitrogen is fed to said exhaust gas after said exhaust gas flows from said semiconductor fabrication operation thereby diluting said fluorine concentration in said gas prior to passing it into said fixed bed.

5. The method of claim 1 wherein said alumina has a total pore volume of at least 0.5 cc/gm and a nominal particle size in the range of one-eighth to one-fourth inch and the fluorine concentration of the gas stream fed to said fixed bed does not exceed 3 volume percent.

6. The method of claim 5 wherein said alumina has a total pore volume of 0.55 cc/gm prior to passing said exhaust gas into said fixed bed.

7. The method of claim 6 wherein said fixed bed has a length to diameter ratio of less than 10 to 1.

8. The method of claim 1 wherein said removing of fluorine is practiced in combination with generation of fluorine by exposing nitrogen trifluoride to microwave-generated plasma that-causes formation of free fluorine radicals that are used in a cleaning, etching or chemical vapor deposition in said semiconductor fabrication.

9. The method of claim 8 wherein said nitrogen trifluoride is supplied to said plasma in nitrogen carrier gas and additional nitrogen is supplied to said exhaust gas to control fluorine concentration in said exhaust gas passed into said fixed bed.

10. The method of claim 8 wherein said alumina prior to contact with fluorine has a total pore volume of at least 0.45 cc/gm and the fluorine concentration in said exhaust gas passed into said fixed bed is not over 3 volume percent.

\* \* \* \* \*